Feb. 15, 1927.
H. ALLISON
1,617,698
WALKING TOY
Filed Feb. 17, 1921   2 Sheets-Sheet 1
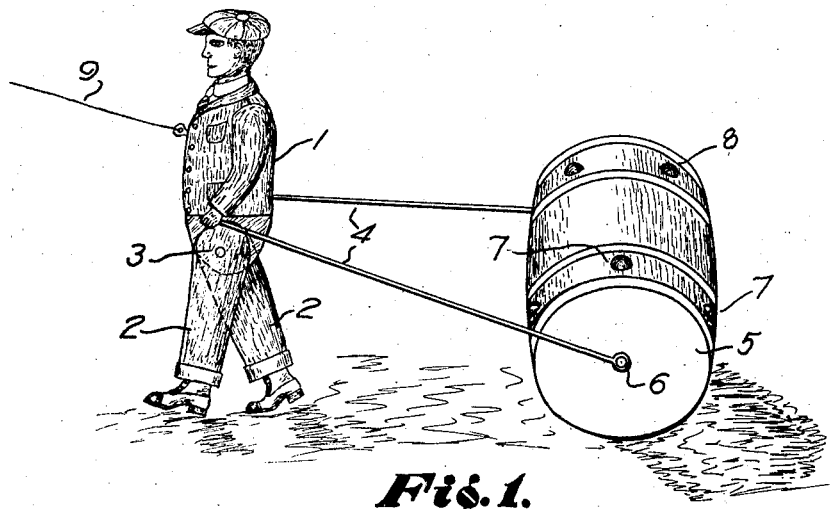
Fig.1.
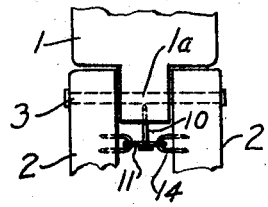
Fig.2.
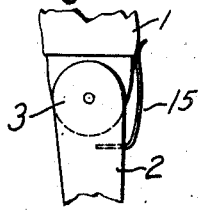
Fig.3.
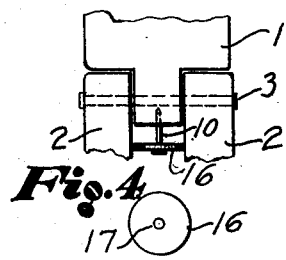
Fig.4.
Fig.4a.
Fig.2a.
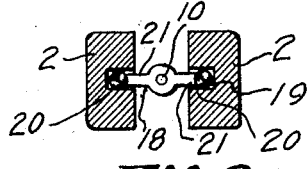
Fig.6.
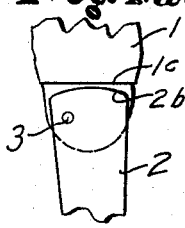
Fig.7.
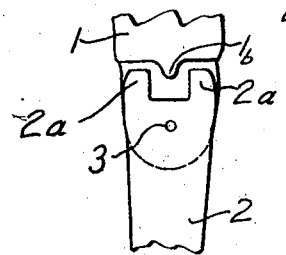
Fig.5.
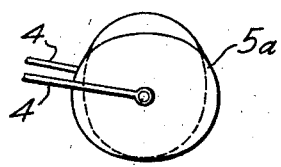
Fig.8.
INVENTOR
Harvey Allison
BY
Chas. W. Mortimer
ATTORNEY Feb. 15, 1927.  H. ALLISON  1,617,698
WALKING TOY
Filed Feb. 17, 1921  2 Sheets-Sheet 2

INVENTOR
Harvey Allison
BY
Chas. W. Mortimer
ATTORNEY

Patented Feb. 15, 1927.

1,617,698

UNITED STATES PATENT OFFICE.

HARVEY ALLISON, OF NEW YORK, N. Y., ASSIGNOR TO WILLIAM J. O'LEARY, OF MONTREAL, QUEBEC, CANADA.

WALKING TOY.

Application filed February 17, 1921. Serial No. 445,667.

This invention relates to a toy, one member of which consists of a body that is provided with pivoted supporting members, preferably in the shape or form of pedal extremities of an animal or bird or the like. The toy is also provided with a member which may be propelled by or may in turn propel the body which is adapted to simulate an animal walking, thus causing the device to advance or travel. The member attached to the walking body is so connected thereto as to cause the pedal extremities thereof to contact alternately with a supporting surface and be raised therefrom so that successive steps will be facilitated and rendered more certain. The invention will be understood from the description in connection with the accompanying drawings, in which the same reference characters designate similar parts in different views.

Fig. 1 is a perspective view of one embodiment of the invention.

Figs. 2, 2ª, 3, 4 and 4ª show modifications of means to cause the pedal extremities to take steps.

Figs. 5, 6 and 7 are modifications showing a device for limiting the steps of the pedal extremities.

Fig. 8 is a modification of a device for causing the stepping body to step.

Figure 13:
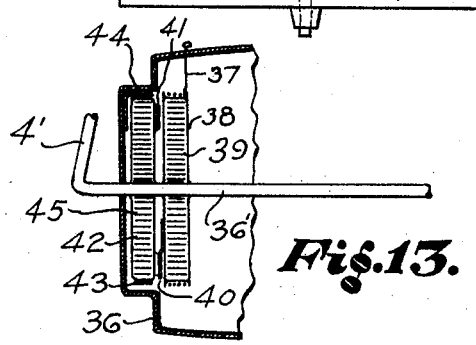
Fig. 13 is a sectional view showing a device for actuating a driving member.

In the drawings reference character 1 indicates a man having legs 2 pivoted to the body on the pivot 3. The body 1 is rigidly connected by shafts 4 to the barrel 5, being pivoted at 6 to said barrel. The barrel 5 is provided with two circumferential series of lugs or projections 7 and 8 respectively which are staggered with relation to each other. The cord 9 may be attached to the body 1 for drawing the same along a supporting surface, or a spring motor or other suitable driving mechanism may be installed in the barrel 5, as indicated in Fig. 13, so as to cause the mechanism to advance.

As the device is caused to advance, either by being driven by the barrel 5 or being drawn by means of the cord 9, the barrel will rest alternately upon one projection 7 and two projections 8 or upon one projection 8 and two projections 7, thereby causing the barrel to tilt from side to side so as to elevate first one and then the other of the shafts 4, thus causing the body 1 to rock from side to side as it advances. The forward and rocking movement of the body 1 as it advances causes first one and then the other of the pedal extremities to strike the supporting surface, thus causing the device to take steps and simulate a man walking.

In Figs. 2 and 2ª the body 1 is shown with a projection $1_a$ into which is driven a pivot pin 10 which acts as a bearing for the link 11, which has a hole 12 through which the pin 10 extends. The link 11 is also provided at each end with an elongated slot 13, in which slots staples 14 are adapted to engage. The staples 14 are driven into the legs 2. It will be seen that as one of the legs 2 is in contact with the supporting surface and the body 1 is made to advance, the link 11 will be caused to turn on the pin 10, thus positively advancing the other leg preparatory to its being placed into contact with the supporting surface when the body rocks to that side. The staples 14 operating in the slots 13 restrict the length of the steps.

In Fig. 3 a spring 15 is shown fixed to the leg 2 and made to bear against the body 1, thus causing the leg 2 to advance when the same is raised from the supporting surface but permitting the same to move relatively in a rearward direction when it is in contact with the supporting surface.

A modification is shown in Fig. 4 in which a disk 16 of resilient material, such as rubber for example, having a hole 17 therein is substituted for the link 11 of Fig. 2. The disk 16 is pivoted on the pin 10 and is of such size that its periphery frictionally engages the inside of the legs 2 to cause the same to move simultaneously in opposite directions on the pivot 3.

In Fig. 5 the leg 2 pivoted on the pivot 3 is shown provided with two lugs $2_a$. The body 1 has a projection $1_b$ disposed between the lugs $2_a$, so that as the lugs $2_a$ come into contact with the projection $1_b$, the travel of the leg 2 will be restricted both in a forward and a backward direction.

In Fig. 6 the link 18, having ends terminating in balls 19, is used in place of the link 11 of Fig. 2. The ends of the link project into sockets 20 in the legs 2, and the sides 21 of the link 11 come into contact with the sides of the sockets 20 and limit the extent of travel of the legs in both a forward and backward direction.

In Fig. 7 the legs 2 are pivoted eccentrically on the pivot 3, so that the same will tend to move forward by gravity when they are raised from the supporting surface. The extent of travel of the leg 2 in Fig. 7 is limited by the portion $2_b$ coming into contact with the opposite portion $1_c$ of the body 1.

Instead of having a barrel 5 with lugs 7 and 8, as shown in Fig. 1, a rolling body $5^a$, as shown in Fig. 8, may be used. In this figure is shown a rolling body which has its two respective ends shaped somewhat elliptically with the axes of the ellipses disposed substantially at right angles to each other, so that as this member rolls along a supporting surface, it will be rocked from side to side and thus cause the walking body to be rocked. The circumference of the elliptical ends will be designed so as to correspond with the desired length of the step that is to be taken by the walking body.

Figure 9:
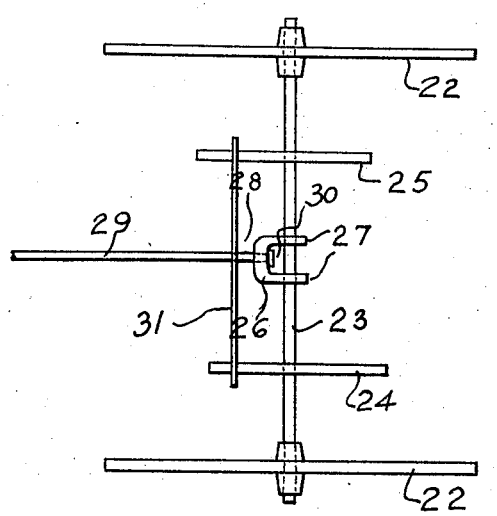
Figs. 9 and 11 are plan views of other modifications for causing the body to step.
Figure 10:
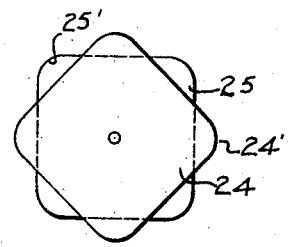
Figs. 10 and 12 are details of parts of Figs. 9 and 11 respectively.

In Fig. 9 is shown a wheeled device that may be used to provide the rocking motion for the walking body. In this modification the wheels 22 are rigidly connected to the axle 23 which carries two cams 24 and 25 rigidly fastened to the axle 23. The cams 24 and 25 are so disposed with respect to each other that their projections 24' and 25' alternate, as is clearly indicated in Fig. 10. A bearing 26 is journaled by means of lugs 27 on the axle 23. The bearing 26 has a hole 28 therethrough, through which hole extends the rod or shaft 29 having the nut 30 on the end thereof. The rod 29 is rigidly attached to the walking body (not shown) and a cross-piece 31 is rigidly connected to the rod 29 and extends outwardly so that its ends will be alternately struck and turned slightly by the cams 24 and 25, thus causing the rod 29 to turn slightly in opposite directions on its own axis, thereby rocking the walking member and causing the same to take steps as it advances.

Figure 11:
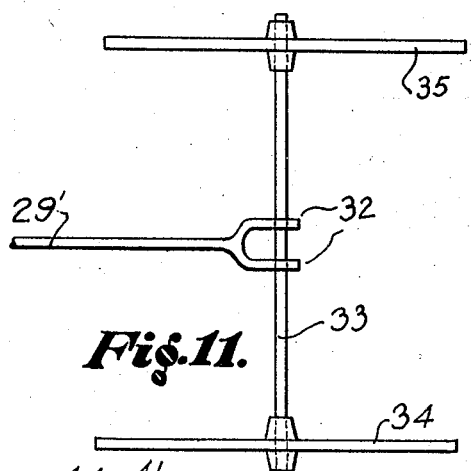
Figure 12:
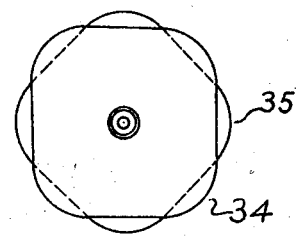

In the modification shown in Fig. 11 the rod or shaft 29' is rigidly connected at one end to the walking body (not shown) and its other end terminates in bifurcations 32 which are journaled on the axle 33, upon which axle are mounted the wheels 34 and 35. The wheels 34 and 35 are irregularly shaped, as shown in Fig. 12, and the irregularities are so disposed with respect to each other that the ends of the axle 33 will be alternately moved upwardly and downwardly, thus slightly turning the rod 29' on its own axis and causing the walking device to be rocked.

In Fig. 13 is shown a driving member 36 which may be substituted for the barrel 5 in Fig. 1. A shaft 36' passes through the driving member and its ends 4' may be rigidly connected to the walking body, as indicated in the other figures. A cord 37 passes around the housing 38 for the spring 39, the outer end of which spring 39 is fastened to the housing 38 and the inner end of which spring 38 is fastened to the shaft 36'. The housing 38 carries a spring pawl 40 which engages the teeth 41 on housing 42. The housing 42 is provided with teeth 43 on its periphery, which teeth engage a spring pawl 44 mounted on the driving member 36. The housing 42 contains a spring 45, the outer end of which is connected to the housing 42 and the inner end of which is connected to the shaft 36'. To wind up the driving device 36 the cord 37 is pulled outwardly, thus revolving the housing 38 and by means of the pawl 40 engaging the teeth 41 also revolving the housing 42, thus winding up the springs 39 and 45. During this turning of the housing 42 the spring pawl 44 on the driving device 36 ratchets over the teeth 43 and maintains the spring 45 in its wound up position when the cord 37 is released. The release of the cord 37 permits the spring 39 to drive the housing 38 backwards as its spring pawl 40 ratchets over the teeth 41. In this way the spring 45 is wound up, and, as the driving device is permitted to roll along a supporting surface, the spring 45 gradually unwinds and may be again wound up in the manner above indicated.

It is to be understood that modifications or variations may be made in this device. Different sorts of bodies, such as those to simulate the appearance of animals or birds, etc. having two or more pivoted supporting members may be operated in accordance with this invention. The body may precede or follow the member which causes the body to rock from side to side and other changes and modifications may be made without departing from the spirit or scope of the invention.

What I claim and desire to secure by Letters Patent is:

1. In a device of the class described, a body having supporting members pivoted thereto, rotatable means rigidly connected to said body, said means being provided with staggered projections to cause it to rock when advanced along a supporting surface, whereby said members will in turn be caused to contact with the supporting surface.

2. In a device of the class described, a body having supporting members pivoted thereto, rotatable means rigidly connected to said body, said means being provided with alternate projections to cause it to rock when advanced along a supporting surface.

3. In a device of the class described, a body having supporting members pivoted thereto, means to advance said body, and rotatable means comprising a barrel-shaped member to cause said body to be rocked sidewise as it is advanced, said barrel-shaped member being provided with projections to cause it to rock.

4. In a device of the class described, a traveling member provided with alternate projections, a body having pivoted members attached thereto, rigid connections between said traveling member and said body, said member being adapted to be supported on said alternate projections in different positions.

5. In a device of the class described, a rotating member having alternating projections thereon to tilt its axis as it rolls along a surface, a body having pivoted members attached thereto, said body and the axis of said rotating member being so connected that when said axis is tilted by said projections coming into contact with a supporting surface said body will be rocked.

6. In a device of the class described, a rotating drum having alternating projections thereon to tilt its axis as it rolls along a surface, a body having pivoted members attached thereto, said body and the axis of said rotating drum being so connected that when said axis is tilted by said projections coming into contact with a supporting surface said body will be rocked.

7. In a device of the class described, a traveling member connected to a body having supporting members pivoted thereto, means to advance said member and body and means to cause automatic sidewise rocking of said member and body as they are advanced.

8. In a device of the class described, a traveling member mounting staggered projections to cause tilting or rocking sidewise movement when it travels, a body having surface contacting members pivoted thereto, a rigid connection between said traveling member and said body whereby said body is tilted simultaneously with said member.

9. In a device of the class described, a body having supporting members pivoted thereto, a rotating traveling member mounting projections in staggered relation connected to said body to tilt the same when said member rotates.

In testimony whereof I affix my signature.

HARVEY ALLISON.